(12) United States Patent
Boschiero et al.

(10) Patent No.: US 10,464,104 B2
(45) Date of Patent: Nov. 5, 2019

(54) METHOD FOR VERIFYING OPERATIVE PARAMETERS OF A SELECTING DEVICE OF A SPRING FORMING MACHINE, AND SPRING FORMING MACHINE

(71) Applicant: Simplex Rapid S.r.l., San Giuliano Milanese (MI) (IT)

(72) Inventors: Giuseppe Boschiero, San Giuliano Milanese (IT); Paolo Boschiero, San Giuliano Milanese (IT)

(73) Assignee: SIMPLEX RAPID S.R.L. (IT)

( * ) Notice: Subject to any disclaimer, the term of this patent is extended or adjusted under 35 U.S.C. 154(b) by 355 days.

(21) Appl. No.: 15/592,758

(22) Filed: May 11, 2017

(65) Prior Publication Data

US 2017/0348734 A1 Dec. 7, 2017

(30) Foreign Application Priority Data

Jun. 7, 2016 (IT) .................. 102016000058178

(51) Int. Cl.
| | | |
|---|---|---|
| *B21C 51/00* | (2006.01) | |
| *B21F 3/02* | (2006.01) | |
| *B21F 35/00* | (2006.01) | |
| *G05B 19/042* | (2006.01) | |
| *B07C 1/00* | (2006.01) | |
| *B07C 5/10* | (2006.01) | |

(52) U.S. Cl.
CPC .................. *B07C 5/10* (2013.01); *B07C 1/00* (2013.01); *B21C 51/00* (2013.01); *B21F 3/02* (2013.01); *B21F 35/00* (2013.01); *G05B 19/0426* (2013.01)

(58) Field of Classification Search
None
See application file for complete search history.

(56) References Cited

U.S. PATENT DOCUMENTS

| | | | | |
|---|---|---|---|---|
| 4,991,277 A | * | 2/1991 | Itaya ..................... | B21F 3/00 |
| | | | | 140/71.5 |
| 7,353,680 B1 | * | 4/2008 | Huang .................... | B21F 3/02 |
| | | | | 72/132 |
| 2008/0270927 A1 | * | 10/2008 | Chang .................... | B21F 35/00 |
| | | | | 715/771 |
| 2011/0218667 A1 | * | 9/2011 | Weigmann ............... | B21D 7/12 |
| | | | | 700/167 |

OTHER PUBLICATIONS

Italian Patent Office, "International Search Report for related Italian Patent Application No. 102016000058178 filed Jun. 7, 2016", dated Mar. 22, 2017 (2 Pages).
Italian Patent Office, "Written Opinion for related Italian Patent Application No. 102016000058178 dated Jun. 7, 2016", (5 Pages).

* cited by examiner

*Primary Examiner* — Shelley M Self
*Assistant Examiner* — Jared O Brown
(74) *Attorney, Agent, or Firm* — Mark Malek; Widerman Malek, PL

(57) ABSTRACT

A method is provided for verifying operative parameters of a selecting device of a machine for forming springs, configured for subdividing the springs formed by a spring forming device of a spring forming machine in at least one first group corresponding to springs having dimensional parameters falling into predefined tolerance values, and a second group corresponding to springs having dimensional parameters varying from the predefined tolerance values.

13 Claims, 5 Drawing Sheets

METHOD FOR VERIFYING OPERATIVE PARAMETERS OF A SELECTING DEVICE OF A SPRING FORMING MACHINE, AND SPRING FORMING MACHINE

RELATED APPLICATIONS

This application claims priority to Italian Patent Application Serial No. 102016000058178 filed on Jun. 7, 2016 and titled Method for Verifying Operative Parameters of a Selecting Device of a Spring Forming Machine, and Spring Forming Machine, the entire content(s) of which is/are incorporated herein by reference

FIELD OF THE INVENTION

The present invention refers to a method for verifying operative parameters of a selecting device of a spring forming machine, and to a spring forming machine. The machine and method according to the invention are adapted to be applied to spiral springs formed by coiling a wire usually of metal. Examples of spiral springs include cylindrical, conical, biconical, constant pitch or variable pitch springs.

BACKGROUND

Spring forming machines, also known as spring coilers, comprise a device for forming spiral springs comprising supplying rolls advancing a wire, normally of metal, through a guide, to coiling tools provided with coiling tips provided with a wire guide. The coiling tips are placed so that, as the wire is gradually supplied, these can deform the wire so that this latter takes a cylindrical shape having a diameter corresponding to the spring diameter, while a further tool makes a determined pitch, so that the spring takes the turn shape typical of the compression springs. When the so formed spring has reached the desired length and number of turns, a cutting tool separates the spring from the unwound wire, so that it can be worked with the said steps for forming another spring.

The springs must be manufactured with a predefined pitch, number of turns and length, falling into determined tolerance limits.

Moreover, the machine comprises a vision system performing a scan of the formed spring, which is delivered to a control unit of the machine itself for verifying the spring dimensional parameters.

Downstream the forming device, the machine further comprises a selecting device which, based on the result of the step of verifying the parameters performed by the control unit, subdivides each formed spring in two or more groups, for example subdivides the springs in a first group corresponding to springs falling into the predefined tolerances, and in a second group comprising out-of-tolerance springs. As an alternative, the selecting device can subdivide the manufactured springs in more than two groups. Generally, the selecting device comprises an inlet in which the springs formed into the forming device enter, and at last two distinct outlets subdividing the springs into distinct groups according to what has been discussed before. One or more movable blades, commanded by the control unit, guide the entering spring towards the outlet corresponding to the group to which the spring is destined.

More and more stringent tolerances, with higher and higher manufacturing speeds, determine an increase of the rate of errors during the selection because of the present selecting technology. Therefore, an out-of-tolerance spring can by mistake fall in the group of the suitable-deemed springs. Therefore, a run of suitable-deemed springs could on the contrary comprise one or more out-of-tolerance springs, so that this run will be entirely compromised for this reason.

A further problem that can happen is caused by a spring jammed inside the selecting device, which can be consequently damaged and then conveyed to the suitable spring group.

Even though the dimensional analysis and the following step of subdividing the springs into groups are correct, what was discussed hereinbefore happens substantially due to a less than perfect synchronization between the springs dropping into the selecting device and the real selection made by the selecting device.

For solving this lack of synchronization, the operator must act on the set operative parameters of the selecting device, which particularly comprise a delay (in other words the time between the instant in which a finished spring is in the dimensional analysis area and the instant in which the spring enters the selecting device) and the effective duration of the selection (in other words the time between the instant in which the spring enters the selecting device and the instant in which exits the same).

At each spring forming cycle performed by the new set parameters of the selecting device, it is necessary to check again the correct subdivision of the spring into the predefined groups, which, due to the stringent tolerances, is complicated and burdensome since it is generally required the use of accurate measuring instruments, typically located in rooms different from the ones in which the coiling machine is placed. In any case, such checks do not ensure the set parameters of the selecting device are correct and perfectly centered in order to avoid the generation of further selection errors.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

Therefore, an object of the present invention consists of providing a method of verifying operative parameters of a selecting device of a spring forming machine, and a spring forming machine enabling to reduce the risk of making an erroneous selections of springs by a selecting device.

This and other objects are obtained by a method for verifying operative parameters of a selecting device of a spring forming machine according to claim 1 and by a spring forming machine according to claim 8.

The dependent claims define possible advantageous embodiments of the invention.

BRIEF DESCRIPTION OF THE DRAWINGS

In order to better understand the invention and to appreciate the advantages, some exemplifying non-limiting embodiments thereof will be described in the following with reference to the attached drawings, wherein.

DETAILED DESCRIPTION OF THE INVENTION

Figure 1:
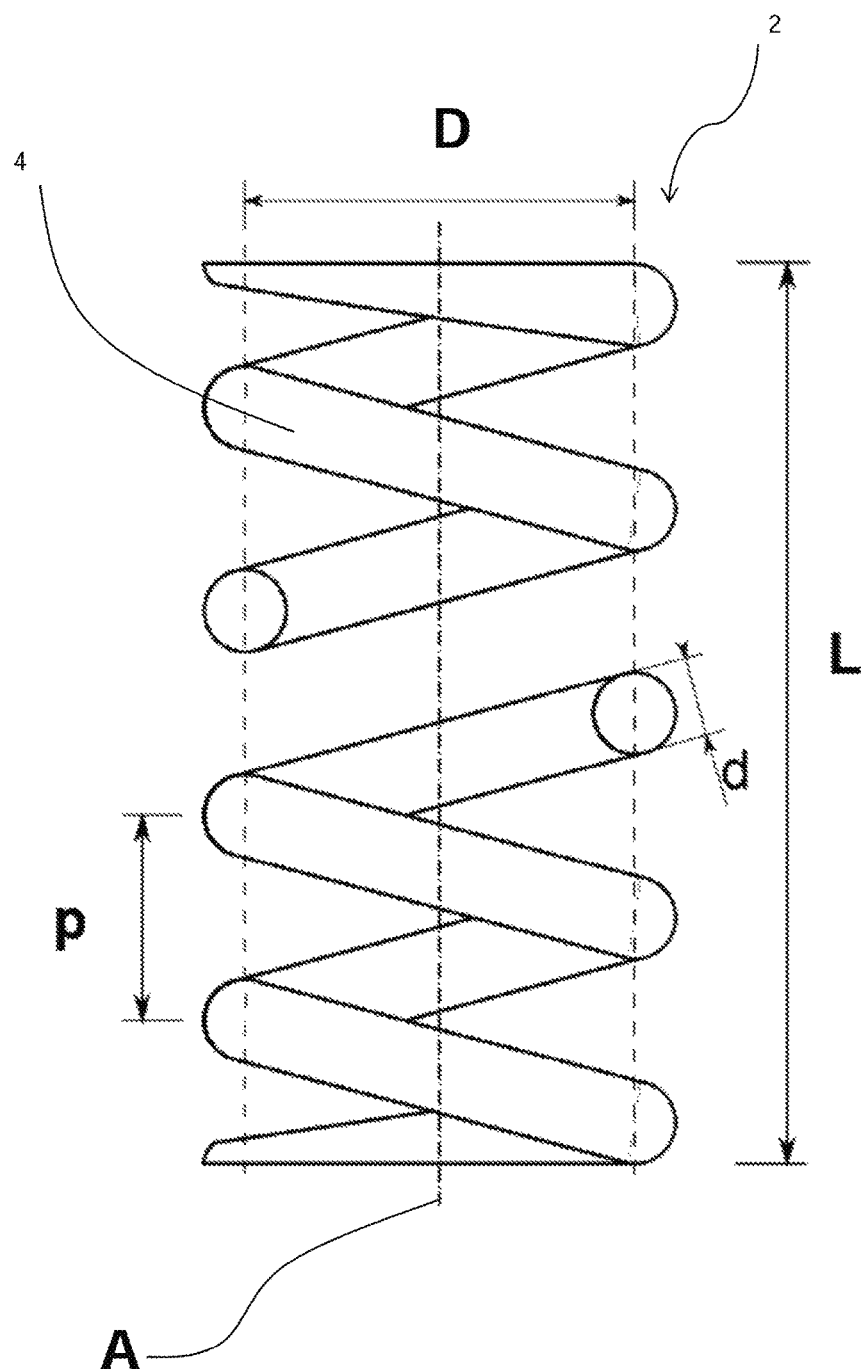
FIG. 1 is a partially sectioned lateral view of a spring showing the characteristic parameters thereof.
Figure 2:
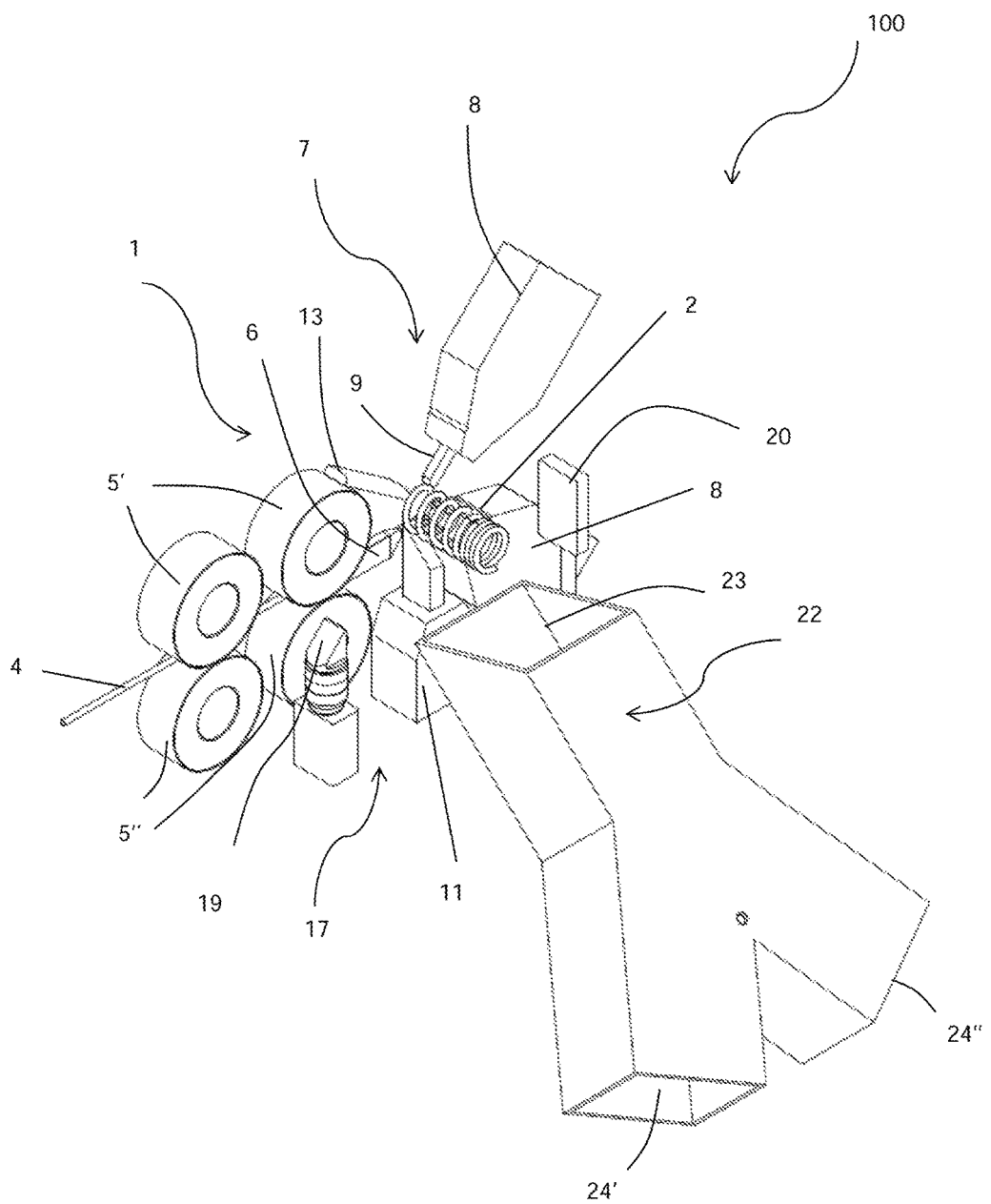
FIG. 2 is a perspective schematic view of a spring forming machine according to an embodiment of the invention.
Figure 3:
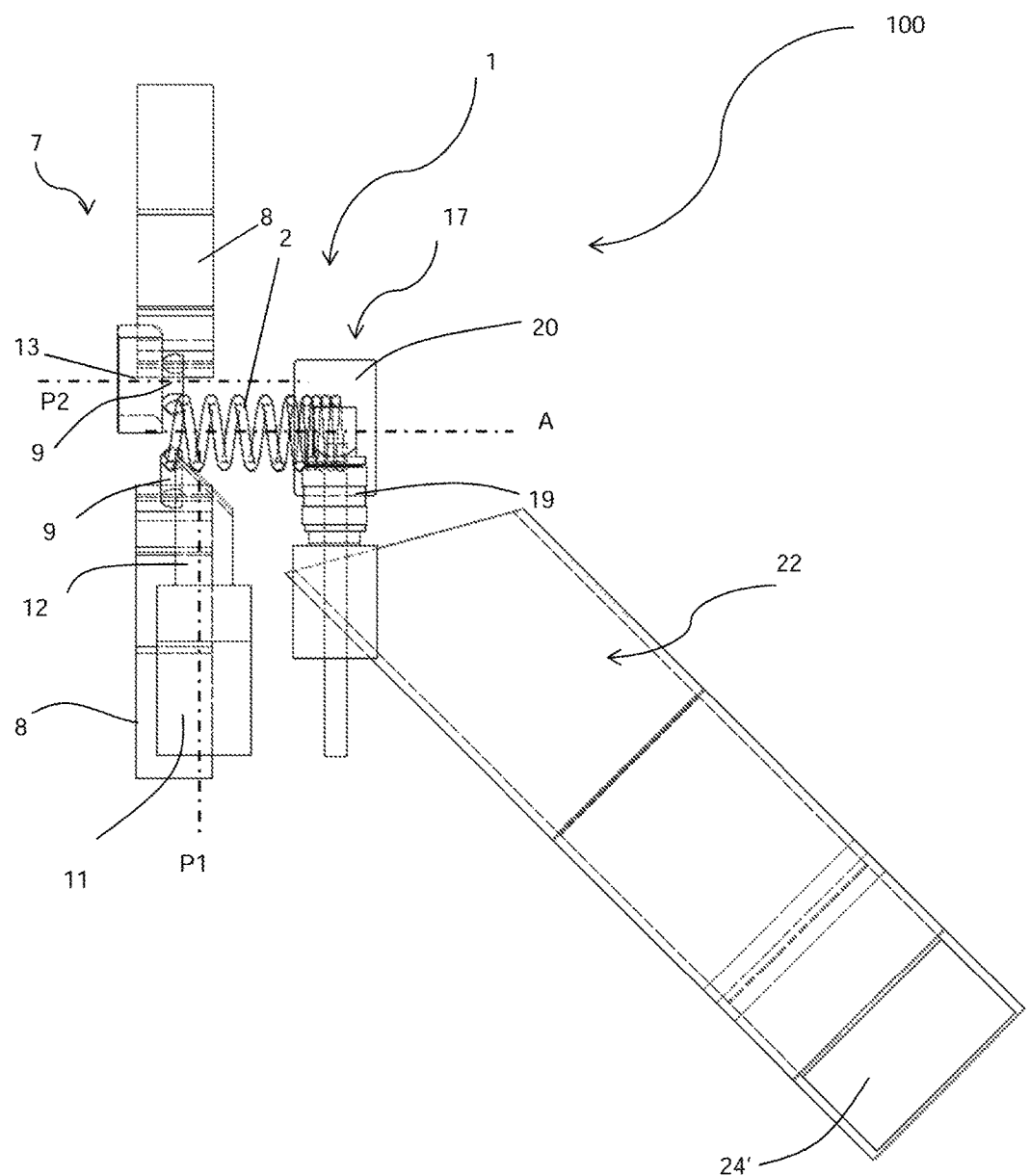
FIG. 3 is a partially transparent lateral schematic view of the spring forming machine in FIG. 2.
Figure 4:
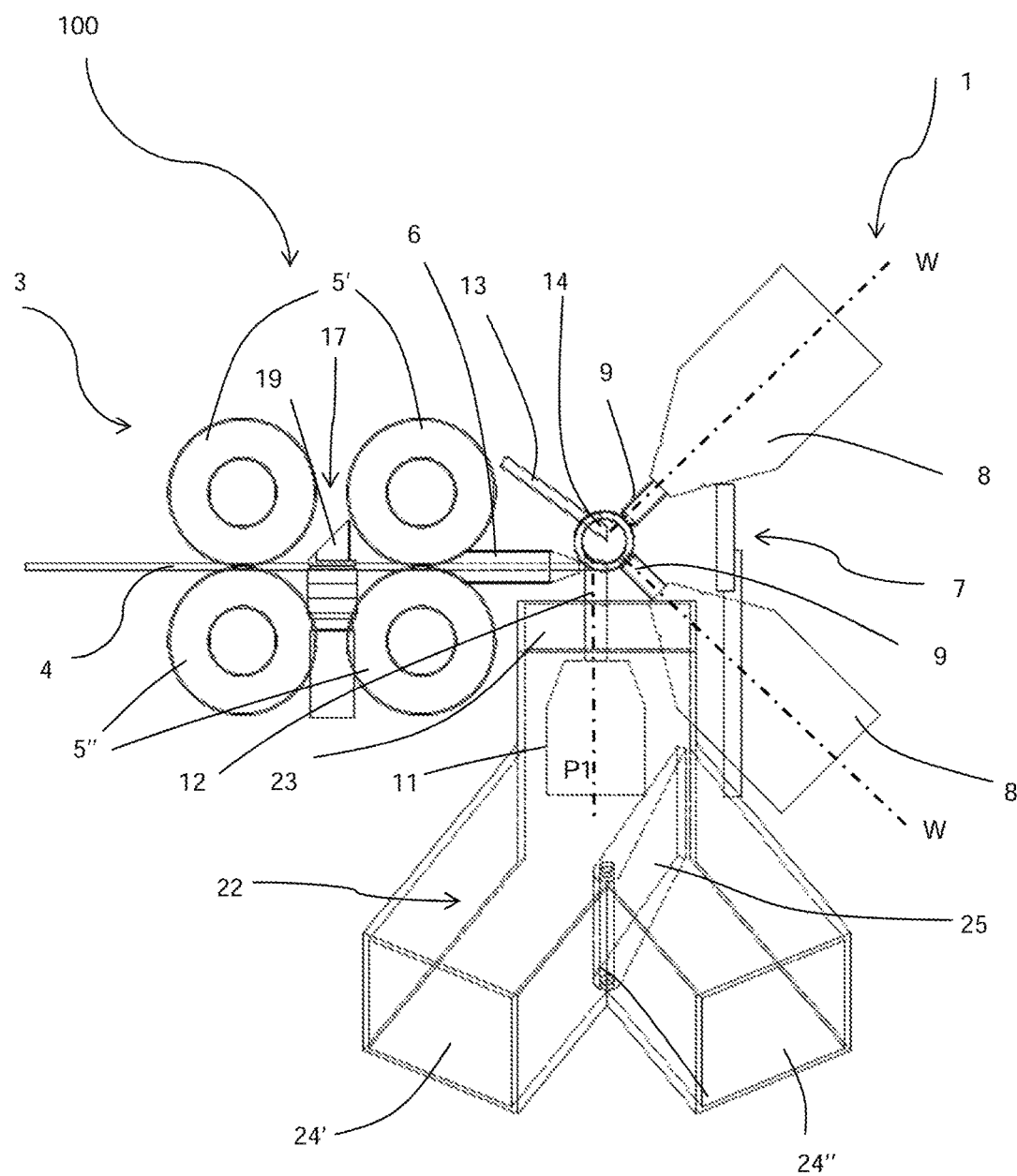
FIG. 4 is a partially transparent front schematic view of a detail of the spring forming machine in FIG. 1.

FIG. 1 schematically illustrates a spiral spring 2 and shows the characteristic parameters thereof. The spring 2 is manufactured by coiling a wire 4, normally of metal, according to a turn (the longitudinal axis of the wire follows the turn development). The spring has a diameter D, equal to the diameter of the cylinder on which the wire axis is turned, when the spiral spring is cylindrical. In this case, the diameter D is constant. However, different shapes are possible (for example a conical or biconical spring) so that the diameter D has a varying trend. The spring 2 has a pitch p given by the distance between two following turns, measured between two points of the longitudinal axis of the wire. The pitch p of the spring in FIG. 1 is constant, however there are springs having a variable pitch.

The spring 2 is characterized by a number of turns (known also as active turns), which contribute to the spring formation, and by end turns.

The spring 2 has a total length L, measured along a longitudinal helix development axis A, between the two end turns. Moreover, the spring 2 has a total length of the wire I forming the spring.

The slope of the turns with respect to a horizontal line is called coiling angle α.

In the following description and in the attached claims, it is made reference to the above mentioned terminology.

Referring now to Figures from 2 to 4, a spring forming machine, according to the invention, is indicated by the reference 100.

The machine 100 comprises a spring forming device 1. According to an embodiment, such device 1 comprises a system 4 supplying a wire which, when suitably deformed, will form a spring. The wire 4 is withdrawn for example from a spool, not illustrated in the Figures. The supplying system 3 preferably comprises one or more pairs of facing rolls 5, 5' dragging the wire for example through a wire guide 6.

Moreover, the device 1 can comprise a coiling system 7 for coiling the wire 4 supplied by the supplying system. The coiling system 7 has the function of coiling the wire 4 according to a helix shape developing along the helix developing axis A having a predefined diameter D. Referring to the embodiment illustrated in Figures from 2 to 4, the helix development axis A is perpendicular to the plane on which the supplied wire lies. The predefined diameter D is selected during the step of setting the spring manufacturing. Such predefined diameter D can have a constant value (in this case a cylindrical spring is obtained) or can have a value varying along the helix development axis A (in this case a conical or biconical spring is obtained, for example.)

Advantageously, the coiling system 7 comprises one or more coiling tools 8 having the function of coiling the wire according to a helix. Referring to the embodiment illustrated in Figures from 2 to 4, the coiling tools 8 are in number equal to two and are placed from each other preferably at 90°. As an alternative, a different number of coiling tools 8 can be provided. The coiling tools 8 are provided with coiling tips 9 destined to contact the wire 4 for bending it according to following turns, which will form the spring turns. The coiling tips 9 are preferably disposed at a right angle with respect to the helix development axis A and have grooves (not shown in the Figures) at their ends, the wire 4 can longitudinally slide inside these grooves.

The coiling tools 8 are movable towards and away from the helix development axis A. The predefined diameter D of the spring formed in the device 1 depends on the position of the coiling tools 8 with respect to the helix development axis A. The coiling tips 9 are further rotatable about coiling axes W perpendicular to the helix development axis A. The object of such rotation is for obtaining desired characteristics of flatness and closure of the end turns of the spring. Further, the angular rotation of the coiling tips 9 subjects the wire 4, sliding in the grooves, to an orientation such to give it a predetermined preload value (known also as starting stress). The terms "preload"/"starting stress" are understood as the tendency of the wire forming the spring to keep the turns tightly against each other. For example, a high preload corresponds to a high tendency of the turns to remain tight against each other.

The device 1 can comprise at least one pitch tool shaped for acting on the wire 4 so that the cylindrical helix, followed by the wire itself by the coiling system 7, has a predefined pitch p selected during the manufacturing setting step. The predefined pitch p depends on the configuration given to the pitch tool/s. The pitch p, and consequently the pitch tool configuration, can be selected to be constant (in this case it is obtained a constant pitch spring), or can have a pitch variable along the helix development axis A (in this case it is obtained a variable pitch spring).

The device 1 can be provided with one or more pitch tools of different types.

According to the illustrated exemplary embodiment, the device 1 comprises a first pitch tool 11 provided with an end 12 disposed at a right angle with respect to the helix development axis A. The end 12 is shaped so that can engage two following turns by being inserted inbetween, so the wire 4 is subjected to the predefined pitch as the following turns are gradually formed. A first pitch tool 11 is movable along a first pitch axis P1 perpendicular to the helix development axis A. Displacements of the first pitch tool 11 and the end 12 thereof along the first pitch axis P1, cause a change of the predefined pitch of a forming spring in the device. The first pitch tool 11 sometimes is conventionally known as vertical pitch tool.

As an alternative or in addition to the first pitch tool 11, the device 1 can comprise a second pitch tool 13 having an end 14 disposed at a right angle with respect to the helix development axis A. The end 14 of the second pitch tool is adapted to act on the wire 4 in order to deform the forming plane of the turn during the wire coiling step for imposing the predefined pitch p to it. The second pitch tool 13 is movable along an axis different from the one of the first pitch tool 11, particularly is movable along a second pitch axis P2 oriented parallel to the helix development axis A. The spring pitch is correlated to the position taken by the second pitch tool 13 along the second pitch axis P2. The second pitch tool 13 is sometimes traditionally known as horizontal pitch tool.

As an alternative or in addition, the predefined pitch P of the spring can be imposed by the coiling tips 9 of the coiling tools 8, by suitably rotating them about the coiling axes W. The coiling tips 9 of the coiling tools 8 can be for example used as pitch tools in case of compression springs having a limited value of the pitch.

Advantageously, the device 1 further comprises a cutting tool (not shown in the Figures) for separating the spring formed in the device 1 from the wire 4, which is actuated in the coiling system 7, once finished the spring itself.

The spring forming machine 100 according to the invention further comprises a measuring system 17 configured to detect the dimensional parameters of each spring formed in the forming device. With reference to the embodiment illustrated in Figures from 2 to 4, the machine 100 can for example comprise a system for detecting when the manufacturing spring reaches the final total length. For example, such system can comprise a camera 19 and an illuminator 20 placed at a distance from the coiling system 7, corresponding to the final length set for the spring.

Moreover, the machine can for example comprise one or more further cameras (not shown in the Figures) adapted to transmit the image of the spring formed at the control unit. This latter, based on the received image, is capable of determining one or more of the above cited dimensional parameters of the spring, such as the pitch and diameter.

Figure 5A:
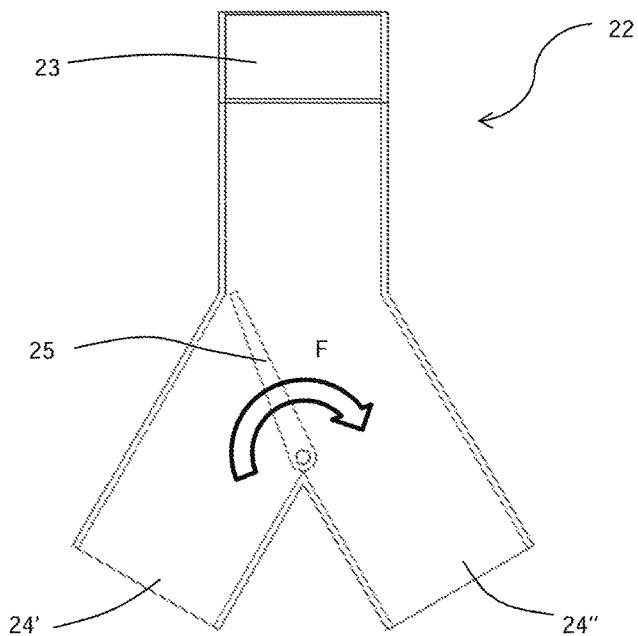
FIGS. 5a and 5b are partially transparent front views of a selecting device of a spring forming machine according to the invention, in two different operative configurations.
Figure 5B:
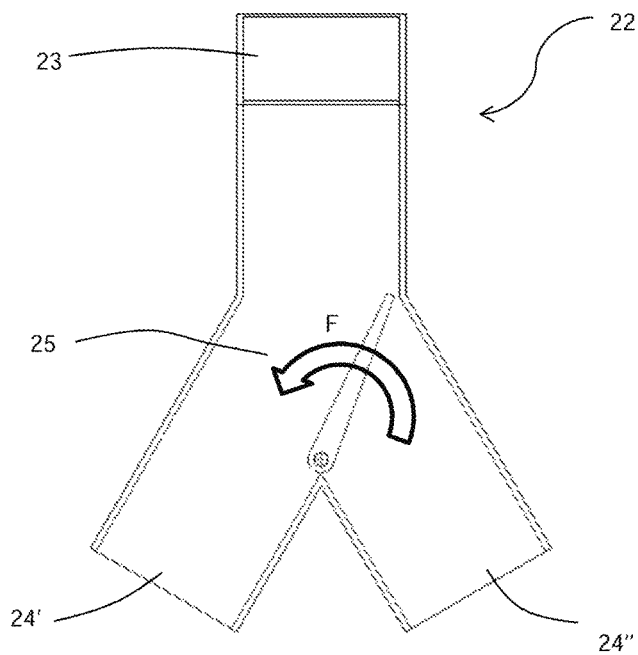

The machine 100, according to the invention, further comprises a selecting device 12 operatively disposed downstream the spring forming device 1. Referring to FIGS. 5 and 5b, the selecting device 22 comprises an inlet 23 through which each spring formed in the forming device 1 enters, and a plurality of outlets 24', 24" . . . which the above cited spring is conveyed towards as a function of the dimensional characteristics thereof. Particularly, the selecting device 12 is configured to subdivide the springs entering through the inlet 23 into at least two groups, particularly into a first group corresponding to springs having dimensional parameters (for example the length) falling into predefined tolerance values, and in a second group corresponding to springs having dimensional parameters varying from said predefined dimensional values. The springs of the first group are suitable, while the springs of the second group, are considered faulty and therefore to be rejected. Obviously, the selecting device 22 can subdivide the springs into a number of groups greater than two, corresponding to an equal number of outlets. Possibly, more than one group can be destined to faulty springs to be rejected, and more than one group can be destined to suitable springs to be stored. For example, a group can include rejected springs because are too long, and a further group can include rejected springs which are too short. With reference to the groups of suitable springs, for example, a group can contain suitable springs but showing the tendency of being long, and a further group can comprise suitable springs but showing the tendency of being short, to be subjected to different grindings.

In the following, it is exemplifyingly made reference for the sake of comprehension, to the case of only two outlets 24' and 24" and of subdividing the springs in only two groups: suitable springs because falling into acceptable predefined tolerance limits, and faulty springs because do not fall into such tolerance limits.

According to a feasible embodiment, the selecting device 22 selects by means of a blade 25 movable inside the selecting device 22, which deflects each spring from the inlet 23 towards the outlet 24' or 24" corresponding to the group of the spring based on the dimensional parameters thereof as detected and analyzed. Such group, as discussed, is determined by the control unit based on the image supplied by the camera 22. The blade 25 can for example take the arrangements illustrated in FIGS. 5a and 5b respectively, by moving along the arrow F. In the arrangement of FIG. 5a, the blade 25 deflects the springs from the inlet 23 towards the outlet 24', while in the arrangement of FIG. 5b, the blade 25 deflects the springs from the inlet 23 towards the outlet 24". The blade 25 can be moved, for example, by an electric motor or by a pneumatic cylinder or actuator (not shown in the Figure) commanded by the control unit. It is observed that, preferably, the blade is normally in a position such to convey the springs to the second group (faulty springs) and moves to a position such to convey the springs to the first group (suitably springs) only when necessary, then it returns to the normal position at the end of the selection step. Moreover, it is observed that, according to a not-illustrated embodiment variant, the selecting device can lack the blade and can select by suitable compressed air jets.

As it is clear, the selecting device 22 can correctly select, in other words the blade 25 can start and finish its movements at the correct instants, only if it is known the accurate time spanning from the instant at which the measuring system 17 completes the analysis of the obtained spring, to the instant at which the spring itself arrives at the inlet 23 (such operative parameter of the selecting device is commonly known as "selection delay"), and also the time spanning from the instant at which the spring enters the inlet 23 to the instant at which exits one of the outlets 24', 24" (such operative parameter of the selecting device is commonly known as "selection duration"). Based on the set delay and duration, the blade 25 will start and finish the selection step (in other words switching the position thereof) at accurate instants. If the set delay and duration are not exact, the blade 25 will move at incorrect instants, consequently the springs are at risk to be conveyed to the incorrect group (a spring preceding or following one to which the selection refers, can be conveyed towards a determined group, for example) or the spring itself jams between the blade 25 and the walls of the selecting device 22. Particularly, it is observed that the selecting device is not only affected by the distance between the inlet 23 of the selecting device 22 and the outlet of the spring forming device 1, but can be also affected by other factors, such as compressed air jets used for directing or accelerating the spring dropping into the selecting device, usually positioned at a height lower than the one of the spring forming device 1, so that the formed spring arrives to the selecting device and passes through it by gravity.

Therefore, the control unit of the machine is configured to implement a method of verifying operative parameters of the selecting device 22, particularly comprising the selection delay and duration.

The method, according to the invention, which can be implemented by the spring forming machine, provides commanding the spring forming device 1 so that this manufactures a test run lot (defined as TEST) wherein there are at least some faulty springs, in other words having dimensional parameters varying from the acceptable tolerance values. The number n of faulty springs with respect to the total number of the springs of the test run, is known and predefined. Moreover, it is known and predefined the sequence by which suitable and faulty springs are consecutively manufactured. Therefore, the forming device 1 can be for example set for manufacturing a faulty spring among m suitable springs. Advantageously, it is observed that the spring forming device 1 is set so that the dimensional parameters of the faulty springs are macroscopically and markedly far from the nominal values, in this way also an unskilled operator is capable of distinguishing the faulty springs from the suitable springs without using specific measuring instruments.

Moreover, the selecting device 22 is set according to assumed operative parameters, particularly according to assumed selection delay and duration.

When the manufacturing of the test spring run (TEST) is started, the dimensional parameters of each spring formed in the forming device 1 are detected by the images acquired by the measuring system 17 and are processed by the control unit. Then, based on such processing, the control unit commands the selecting device 22 to subdivide each of the springs of the test run into a first group (suitable springs) and into a second group (faulty springs).

According to the settings of the spring forming device, when the manufacturing of the test run (TEST) ends, if the parameters of the selecting device are correct, the the second spring group should contain only springs deliberately set as faulty, of which the number n is known and the dimensional errors are preferably macroscopic in order to be easily identified to the naked eye of an operator.

Therefore, the method provides a comparison between the number of faulty springs which were effectively selected by the selecting device for the second group and the predetermined number n of faulty springs which was set for the test run (TEST). Such comparison can be made by an operator, by observing the two groups of springs and counting the springs present in each of them.

If the second group contains only faulty springs in a number equal to the predetermined number n of faulty springs to be manufactured by the forming device for the test run (TEST), therefore the operative parameters of the selecting device are correct.

Viceversa, if the second group contains a number of faulty springs different from the predetermined number n of faulty springs to be manufactured by the forming device for the test run, or one or more suitable springs, therefore the operative parameters of the selecting device are incorrect, and consequently these must be modified.

Modifying the operative parameters can be made by the operator by acting on an user-interface device, for example.

Once the parameters are modified according to what was hereinbefore discussed, the method is repeated, and therefore a further test run (TEST) is manufactured for verifying if the selection is correctly done by means of the new operative parameters of the selecting device. Therefore, the method is iteratively repeated until the selection is correctly done.

It is observed that if the number of faulty springs in the second group matches the predefined number n of faulty springs for the test run, there will be the possibility that the operative parameters of the selecting device, despite were correct for that test run, do not match the ideal values, so that selection errors can anyway occur when manufacturing springs according to these parameters.

Therefore, in order to ensure a greater reliability and operability of the selecting device with time, it is possible to set the machine so that it manufactures further test lots containing a predetermined number consisting of faulty springs according to what was discussed with reference to the first test run, wherein for each further test run the operative parameters of the selecting device are increasingly and then decreasingly modified (or viceversa) from the operative parameters previously determined. In this way, it is possible to experimentally determine the limit values of the operative parameters of the selecting device: beyond these values erroneous selections start taking place and therefore to determine the optimal values, which could be set as intermediate values with respect to the found limit values, for example. Illustratively, it is possible to set the duration of the selection as a fixed parameter and to gradually increasingly and then decreasingly (or viceversa) modify the value of the delay until the upper and lower limit values corresponding to the duration of the previously set selection, are determined. Possibly, such operation can be repeated for different values of the selection duration.

Moreover, there is the possibility, particularly when the dimensional tolerances of the springs are very tight, that the springs of the test run which should be suitable (in other words, the springs of the test run in addition to the deliberately faulty springs) could be also manufactured out-of-tolerance by the forming device 1. In this case, if the selecting device correctly performs the selection, at the end of the manufacturing step of the test run, the second group will contain both n deliberately faulty springs set in the test run, and springs belonging to the group of the suitable springs of the test run which however were casually produced out-of-tolerance. Therefore, the second group will contain a number of springs greater than the number n of faulty springs set for the test run although the selecting device correctly performed the selection. In order to avoid this condition, it is possible to set the selecting device so that when manufacturing the test run, this selects in the first group (in other words, in the group of the suitable springs) also the casually manufactured out-of-tolerance springs, so that the selection of the second group is verified only on the deliberately faulty springs. Such operation is possible since it is known the sequence by which the suitable springs and faulty springs are manufactured in the test run.

The above described method can be implemented in a computer program directly storable in a working memory of a processing system for executing the steps of the method itself. Particularly, such computer program can be stored in the control unit of the machine.

Moreover, it is observed that the method according to the invention, besides being implemented by a software, can be implemented by hardware devices (for example control units), or by combining hardware and software.

From the hereinbefore provided description, a person killed in the art can appreciate as the method and machine according to the invention, enable also not particularly skilled operators to simply and quickly verify the operative parameters of the selecting device. Therefore, the risk of producing spring runs containing faulty springs is reduced.

To the described embodiments, the person skilled in the art in order to meet specific contingent needs, could introduce several additions, modifications or substitutions of elements with other operatively equivalent elements, without falling out of the scope of the attached claims.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method for verifying operative parameters of a selecting device of a machine for forming springs, configured for subdividing the springs formed by a spring forming device of a spring forming machine into at least one first group, corresponding to springs having dimensional parameters falling into predefined tolerance values, and a second group, corresponding to springs having dimensional parameters varying from said predefined tolerance values, said method comprising:
   setting the spring forming device such that it makes a test run of springs comprising a predetermined number of faulty springs having dimensional parameters varying from said predefined tolerance values, and a predetermined number of suitable springs having dimensional parameters falling into said predefined tolerance values;
   detecting the dimensional parameters of each spring formed in the spring forming device by a measuring system of the machine;
   subdividing, by said selecting device, the springs formed by the spring forming device into said at least one first and said second group;
   verifying the absence of suitable springs among the springs selected by the selecting device in the second group; and
   comparing the number of the faulty springs selected by the selecting device in the second group with said predetermined number of faulty springs set of the test run.

2. The method according to claim 1, wherein subdividing by the selecting device the springs formed by the forming device into said at least one first and said second group comprises selecting in the first group the suitable springs manufactured outside said predefined tolerance values by the spring forming device.

3. The method according to claim 1, wherein the dimensional parameters of the faulty springs set for the test run are such that the faulty springs are visually discernible from the suitable springs of the test run by an operator without using measuring systems.

4. The method according to claim 1, further comprising: modifying the operative parameters of the selecting device if the presence of at least one suitable spring in the second group is verified and/or if the number of faulty springs in the second group is different from said predetermined number of faulty springs set for the test run.

5. The method according to claim 1, further comprising: approving the operative parameters of the selecting device if the absence of suitable springs in the second group is verified, and if the number of faulty springs in the second group is equal to the predetermined number of faulty springs set for the test run.

6. The method according to claim 5, further comprising:
   setting the spring forming device such that it makes further test runs of springs, wherein in each further test run operative parameters of the selecting device are gradually increasingly and decreasingly modified around the approved operative parameters of the selecting device;
   determining limit values of the operative parameters of the selecting device as the operative parameters farthest from the approved operative values of the selecting device wherein for the respective test run of test springs the absence of suitable springs in the second group is verified and wherein the number of faulty springs in the second group is equal to the predetermined number of faulty springs set for the respective test run; and
   modifying the operative parameters of the selecting device approved as values comprised between said limit values.

7. The method according to claim 1, wherein said operative parameters of the selecting device comprise a selection delay and selection duration.

8. A machine for forming springs, comprising:
   a device for forming springs defined as a spring forming device;
   a measuring system configured for detecting dimensional parameters of each spring formed in the spring forming device;
   a selecting device configured for subdividing the springs formed by the spring forming device into at least one first group, corresponding to springs having dimensional parameters falling into predefined tolerance values, and a second group, corresponding to springs having dimensional parameters varying from said predefined tolerance values; and
   a control unit connected to the spring forming device, measuring system, and selecting device, and configured for commanding the selecting device such that it subdivides the springs formed by the spring forming device into said at least one first and said second group based on the dimensional parameters of each formed spring detected by the measuring system;

wherein said control unit is further configured for commanding the spring forming device such that it makes a test run of springs comprising a predetermined number of faulty springs having dimensional parameters varying from said predefined tolerance values, and a predetermined number of suitable springs having dimensional parameters falling into said predefined tolerance values.

9. The machine for forming springs according to claim 8, wherein said control unit is further configured for commanding the selecting device such that it selects in the first group the suitable springs manufactured outside said predefined tolerance values by the spring forming device.

10. The machine for forming springs according to claim 8, wherein said control unit is further configured for commanding the spring forming device such that it makes further test runs of springs, wherein in each further test run the operative parameters of the selecting device are gradually increasingly and decreasingly modified around approved operative parameters of the selecting device.

11. The machine for forming springs according to claim 8, comprising a user-interface device connected to the control unit and settable such that an operator can modify the operative parameters of the selecting device by said user-interface device.

12. The machine for forming springs according to claim 8, wherein said operative parameters of the selecting device comprise a selection delay and selection duration.

13. The machine for forming springs according to claim 8, wherein the dimensional parameters of the faulty springs, set for the test run, are such that the faulty springs are visually discernible from the suitable springs of the test run by an operator without using measuring systems.

* * * * *